United States Patent
Moy et al.

(10) Patent No.: US 11,639,231 B2
(45) Date of Patent: *May 2, 2023

(54) SYSTEMS AND METHODS FOR FAULT DETECTION AND CONTROL IN AN ELECTRIC AIRCRAFT

(71) Applicant: BETA AIR, LLC, South Burlington, VT (US)

(72) Inventors: Nicholas Moy, Burlington, VT (US); Hamid-Reza Ossareh, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/855,651

(22) Filed: Jun. 30, 2022

(65) Prior Publication Data
US 2023/0002068 A1 Jan. 5, 2023

Related U.S. Application Data

(63) Continuation of application No. 17/365,049, filed on Jul. 1, 2021, now Pat. No. 11,420,756.

(51) Int. Cl.
| | |
|---|---|
| *B64D 31/00* | (2006.01) |
| *B64F 5/60* | (2017.01) |
| *B64D 27/24* | (2006.01) |
| *H02P 29/024* | (2016.01) |
| *B64D 31/06* | (2006.01) |
| *G01L 5/22* | (2006.01) |

(52) U.S. Cl.
CPC ............. *B64D 31/00* (2013.01); *B64D 27/24* (2013.01); *B64F 5/60* (2017.01); *H02P 29/024* (2013.01); *B64D 31/06* (2013.01); *G01L 5/22* (2013.01)

(58) Field of Classification Search
CPC ........ B64D 31/00; B64D 31/06; B64D 27/24; B64F 5/60; H02D 31/06; G01L 5/22
See application file for complete search history.

(56) References Cited

U.S. PATENT DOCUMENTS

| | | | |
|---|---|---|---|
| 10,494,095 B2* | 12/2019 | Groninga | B64C 27/024 |
| 2016/0059958 A1* | 3/2016 | Kvitnevskiy | B64C 27/39 244/17.23 |
| 2018/0237148 A1* | 8/2018 | Hehn | B64C 39/024 |
| 2019/0071172 A1* | 3/2019 | Caldwell | B64C 27/64 |
| 2019/0202546 A1* | 7/2019 | Mahboubi | B64C 27/28 |
| 2019/0332126 A1* | 10/2019 | Irwin, III | B64C 27/52 |
| 2020/0031478 A1* | 1/2020 | Clark | B64C 3/32 |

(Continued)

*Primary Examiner* — Mussa A Shaawat
(74) *Attorney, Agent, or Firm* — Caldwell Intellectual Property Law

(57) ABSTRACT

A system for fault detection and control in an electric aircraft including an inertial measurement unit, the inertial measurement unit including at least a sensor configured to detect a torque datum associated with at least a propulsor. The system includes an observer, the observer configured to generate a torque prediction datum associated with the at least a propulsor, compare the torque prediction datum with the torque datum, and generate a residual datum as a function of the comparison. The system includes a mixer, the mixer comprising circuitry configured to generate, as a function of the residual datum, a torque priority command datum and transmit, to the at least a propulsor, the torque priority command datum.

20 Claims, 7 Drawing Sheets

(56) References Cited

U.S. PATENT DOCUMENTS

| | | | | |
|---|---|---|---|---|
| 2020/0081432 A1* | 3/2020 | Szmuk | ............... | B64C 11/20 |
| 2020/0103922 A1* | 4/2020 | Nonami | ............... | G05D 1/0072 |
| 2020/0277080 A1* | 9/2020 | Wiegman | ............... | B64D 47/00 |
| 2020/0307390 A1* | 10/2020 | Clark | ............... | B60L 15/2045 |
| 2020/0398992 A1* | 12/2020 | Morrison | ............... | B64D 27/24 |
| 2021/0371123 A1* | 12/2021 | List | ............... | B64C 29/0025 |
| 2021/0380224 A1* | 12/2021 | Clark | ............... | G05D 1/0016 |

\* cited by examiner

SYSTEMS AND METHODS FOR FAULT DETECTION AND CONTROL IN AN ELECTRIC AIRCRAFT

CROSS-REFERENCE TO RELATED APPLICATIONS

This application is a continuation of non-provisional application Ser. No. 17/365,049 filed on Jul. 1, 2021 and entitled "SYSTEMS AND METHODS FOR FAULT DETECTION AND CONTORL IN AN ELECTRIC AIRCRAFT" the entirety of which is incorporated herein by reference.

FIELD OF THE INVENTION

The present invention generally relates to the field of electric aircraft. In particular, the present invention is directed to systems and methods for fault detection and control under one rotor inoperable condition configured for use in an electric aircraft.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo. A system and method for fault detection and control therefor configured for use in an electric aircraft is useful and necessary to control aircraft under certain conditions, in embodiments.

SUMMARY OF THE DISCLOSURE

In an aspect, a system for fault detection and control in an electric aircraft, the system including a flight controller, the flight controller including at least a sensor, wherein the at least a sensor configured to detect a sensed datum associated with at least a propulsor. The system further including an observer, the observer configured to generate a prediction datum associated with the at least a propulsor, compare the prediction datum with the sensed datum, generate a residual datum as a function of the comparison. and determine a failure state of the at least a propulsor as a function of the residual datum. The system further including a mixer configured to operate in a first mode in which the mixer is configured to control a first plurality of the at least a propulsor and a second mode in which the mixer is configured to control a second plurality of the at least a propulsor, the mixer comprising circuitry configured to generate, as a function of the residual datum and the failure state, a torque priority command datum and transmit, to the at least a propulsor, the torque priority command datum configured to command operation of the first plurality of the at least a propulsor.

In another aspect, a method for fault detection and control in an electric aircraft, the method including detecting, at an at least a sensor, a sensed datum associated with at least a propulsor, generating, at an observer, a prediction datum associated with the at least a propulsor comparing, at the observer, the prediction datum and the sensed datum, generating, at the observer, as a function of the comparison, a residual datum. generating, at the observer, as a function of the residual datum, a failure state of the at least a propulsor, generating, at a mixer that is configured to operate in a first mode in which the mixer is configured to control a first plurality of the at least a propulsor and a second mode in which the mixer is configured to control a second plurality of the at least a propulsor, as a function of the residual datum and the failure state, a torque priority command datum, and transmitting, to the at least a propulsor, the torque priority command datum configured to command operation of at least one flight component of the electric aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
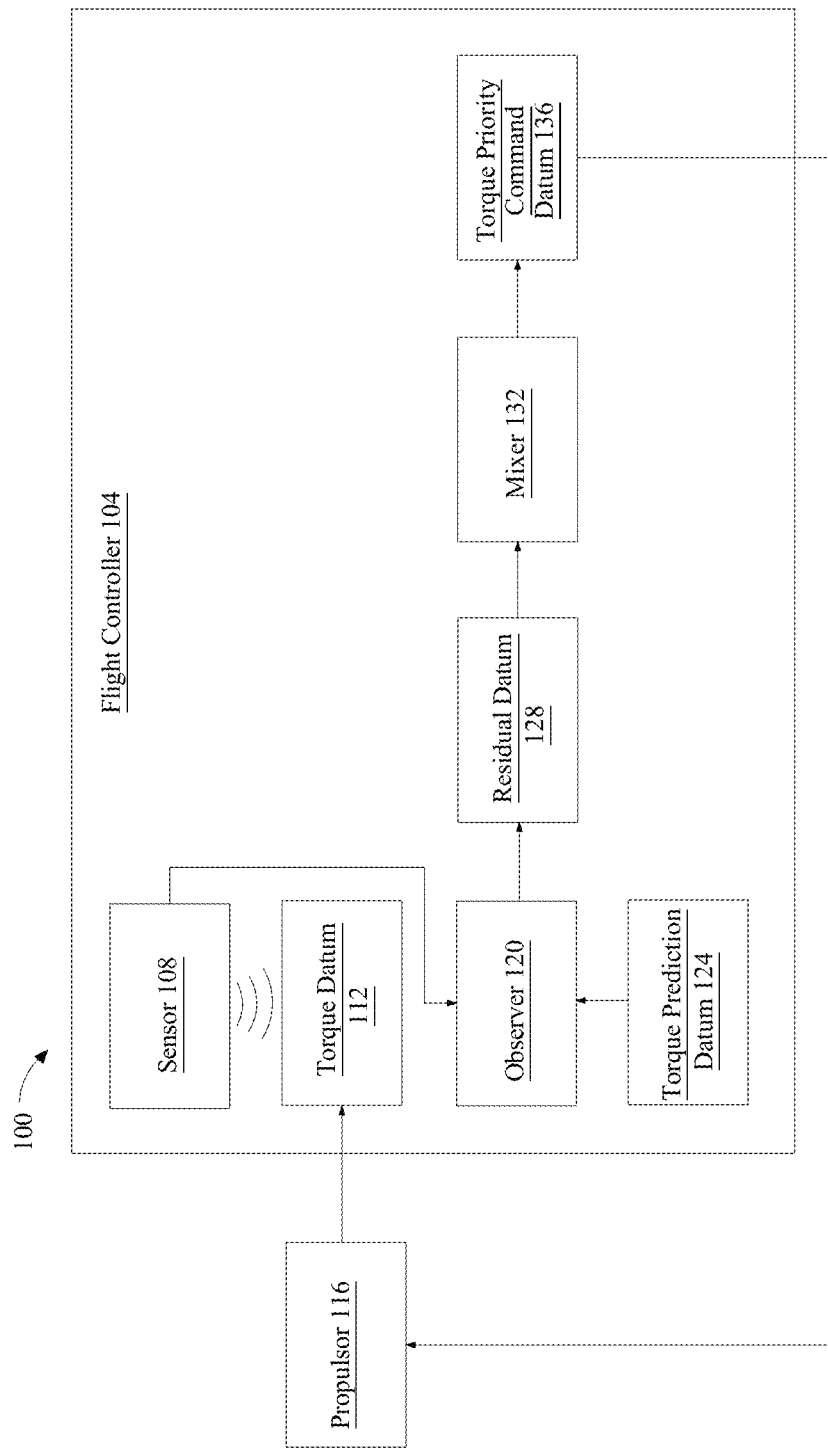
FIG. 1 is a block diagram of an exemplary embodiment of a system for fault detection and control under one rotor inoperable conditions.

Referring now to FIG. 1, an exemplary embodiment of a system 100 for fault detection and control under one rotor inoperable condition configured for use in an electric aircraft is illustrated. System includes at least a computing device, which may include or be a processor, flight controller, and/or controller, or portions thereof. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 for fault detection and control under one rotor inoperable condition configured for use in an electric aircraft includes a flight controller 104. Flight controller 104 may be consistent with any flight controller or controller as described herein such as computing device herein above and/or flight controller 304 herein below. Still referring to FIG. 1, system 100 configured for use in electric aircraft is presented. System 100 includes flight controller 104 configured to provide signals to any propulsor including at least a propulsor as described herein below. Flight controller 104 may be a computing device as previously disclosed. Flight controller 104 may be a processor configured to control the output of a plurality of propulsors in response to inputs. Inputs to this system may include pilot manipulations of physical control interfaces, remote signals generated from electronic devices, voice commands, physiological readings like eye movements, pedal manipulation, or a combination thereof, to name a few. Flight controller 104 may include a proportional-integral-derivative (PID) controller. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. PID controllers may automatically apply accurate and responsive correction to a control function in a loop, such that over time the correction remains responsive to the previous output and actively controls an output. Flight controller 104 may include damping, including critical damping to attain the desired setpoint, which may be an output to a propulsor in a timely and accurate way.

Still referring to FIG. 1, flight controller 104 may be implemented consistently with any flight controller as described herein. Flight controller 104 is configured to provide signals comprising a plurality of attitude commands. "Attitude", for the purposes of this disclosure, is the relative orientation of a body, in this case an electric aircraft, as compared to earth's surface or any other reference point and/or coordinate system. Attitude may be displayed to pilots, personnel, remote users, or one or more computing devices in an attitude indicator, such as without limitation a visual representation of the horizon and its relative orientation to the aircraft. Signals may include a desired change in aircraft trajectory as inputted by an onboard or offboard pilot, remotely located user, one or more computing devices such as an "autopilot" program or module, any combination thereof, or the like. Initial vehicle torque signal 108 may include without limitation one or more electrical signals, audiovisual signals, physical indications of desired vehicle-level torques and forces, or the like. "Trajectory", for the purposes of this disclosure is the path followed by a projectile or vehicle flying or an object moving under the action of given forces. Trajectory may be altered by aircraft control surfaces and/or one or more propulsors working in tandem to manipulate a fluid medium in which the object is moving through. Initial vehicle torque signal may include a signal generated from manipulation of a pilot input control consistent with the entirety of this disclosure.

Further referring to FIG. 1, flight controller 104 may include one or more circuit elements communicatively connected together. One or more sensors may be communicatively connected to at least a pilot control, the manipulation of which, may constitute at least an aircraft command. Signals may include electrical, electromagnetic, visual, audio, radio waves, or another undisclosed signal type alone or in combination. Signals may be configured to translate and/or encode a pilot's desire and/or instruction to manipulate one or more elements of an aircraft's operation and communicate said desires to one or more other elements communicatively connected thereto. Signals may be electrical signals transmitted through wires, busses, wirelessly, or otherwise electrically conductive paths transmitted from one component to at least a second component. For example, and without limitation, a pilot may desire to increase torque output in at least a propulsor consistent with this disclosure and manipulate an input to indicate as such. Signals may be generated from manipulation and transmitted to a flight controller, controller, processor, propulsor, flight component, or other components and/or combinations thereof to command at least a propulsor to increase torque output. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, a plurality of attitude commands may indicate one or more measurements relative to an aircraft's pitch, roll, yaw, or throttle compared to a relative starting point. One or more sensors may measure or detect the aircraft's attitude and establish one or more attitude datums. An "attitude datum", for the purposes of this disclosure, refers to at least an element of data identifying and/or a pilot input or command. At least a pilot control may be communicatively connected to any other component presented in system, the communicative connection may include redundant connections configured to safeguard against single-point failure. Attitude commands may indicate a pilot's instruction to change the heading and/or trim of an electric aircraft. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure, hereinbelow. "Pitch", for the purposes of this disclosure refers to an aircraft's angle of attack, that is the difference between the aircraft's nose and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor. Signals may include an electrical signal. At least an aircraft command may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal.

Flight controller 104 may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller 104 may be designed and configured to operate electronic aircraft via fly-by-wire. Flight controller 104 is communicatively connected to each propulsor; as used herein, flight controller 104 is communicatively connected to each propulsor where flight controller 104 is able to transmit signals to each propulsor and each propulsor is configured to modify an aspect of propulsor behavior in response to the signals. As a non-limiting example, flight controller 104 may transmit signals to a propulsor via an electrical circuit connecting flight controller 104 to the propulsor; the circuit may include a direct conductive path from flight controller 104 to propulsor or may include an isolated coupling such as an optical or inductive coupling. Alternatively, or additionally, flight controller 104 may communicate with a propulsor using wireless communication, such as without limitation communication performed using electromagnetic radiation including optical and/or radio communication, or communication via magnetic or capacitive coupling. Vehicle controller may be fully incorporated in an electric aircraft containing a propulsor and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively connect flight controller 104 to propulsors. Persons skilled in the art, upon reviewing the entirety of this disclosure, will be aware of various ways to monitor resistance levels and apply resistance to linear thrust control, as used and described herein.

With continued reference to FIG. 1, system 100 and/or flight controller 104 may be configured to utilize dynamic modeling. Flight controller 104 may include one or more mathematical models utilizing the same or differing method of control. Any one or combination of any components in the herein disclosed system 100 may utilize differing methods of control alone or in combination. For example, and without limitation, flight controller 104 may utilize differing methods of control for certain real-world conditions, such as unusual attitude behavior, certain ranges of yaw, angle of attack, rates of movement such as rapid pitch angle change, one propulsor (such as an electric motor or rotor) inoperable or the like. A method of control may utilize one or more inputs specific to the method such as yaw angle, yaw angle rate of change, or the like. "Quaternions", for the purposes of this disclosure are mathematical expressions of the form a+bi+cj+dk, where i, j, and k may represent unit vectors pointing along axes in three-dimensional Cartesian space. Quaternions may be used to represent rotation. A "unit quaternion" is a quaternion of unit length, i.e., a quaternion of form $$\frac{q}{\|q\|^2}$$

where $\|q\|$ is a norm representing a length of a quaternion q. Unit quaternions may also be called rotation quaternions as they may represent a 3D rotation group as described below. In 3-dimensional space, according to Euler's rotation theorem, any rotation or sequence of rotations of a rigid body or coordinate system about a fixed point may be treated as equivalent to a single rotation by a given angle about a fixed axis (called the Euler axis) that runs through the fixed point. An Euler axis may typically be represented by a unit vector u→. Therefore, any rotation in three dimensions may be represented as a combination of a vector u→ and a scalar. Quaternions may provide a simple way to encode this axis-angle representation in four numbers, and may be used to apply the corresponding rotation to a position vector, representing a point relative to the origin in $R^3$. Euclidean vectors such as (2, 3, 4) or ($a_x$, $a_y$, $a_z$) may be rewritten as 2i+3j+4k or $a_x$i+$a_y$j+$a_z$k, where i, j, k are unit vectors representing the three Cartesian axes (traditionally x, y, z), and also obey multiplication rules of fundamental unit quaternion. Unit quaternions may represent an algebraic group of Euclidean rotations in three dimensions in a straightforward way.

With continued reference to FIG. 1, an aircraft quaternion control may be a control system that uses quaternions to model motion in three dimensions, and more specifically, in the three attitude components of aircraft orientation, pitch, roll, and yaw. Quaternions used in quaternion aircraft control may be any of the quaternions discussed herein. Quaternion control may be useful in the field of aircraft control as a quaternion is a 4-dimensional vector used to describe the transformation of a vehicle in 3-dimensions. The use of quaternions may be favored over other descriptors due to their non-singularity properties at any aircraft attitude. Traditional aeronautic transformations (Euler angles) may be hindered by a phenomenon known as gimbal lock. Gimbal lock may cause a loss of degree of freedom (DOF) which could lead to controller instability. Since this thesis explores aggressive flight regimes, a quaternion attitude descriptor was chosen to provide a singularity-free rotation from hover to horizontal flight.

With continued reference to FIG. 1, system 100 includes at least a sensor 108. At least a sensor 104 may be communicatively connected to at least a pilot control, the manipulation of which, may constitute at least an aircraft command. "Communicative connecting", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually.

A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. At least pilot control may be physically located in the cockpit of the aircraft or remotely located outside of the aircraft in another location communicatively connected to at least a portion of the aircraft. "Communicatively connect", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure.

With continued reference to FIG. 1, at least a sensor 108 is configured to detect a torque datum 108. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is an element of data representing one or more parameters detailing power, energy, force, and/or torque output by one or more propulsors, flight components, or other elements of an electric aircraft. Torque datum 112 may indicate the torque output of at least a propulsor 116. At least a propulsor 116 may include any propulsor as described herein. In embodiment, at least a propulsor 116 may include an electric motor, a propeller, a jet engine, a paddle wheel, a rotor, turbine, or any other mechanism configured to manipulate a fluid medium to propel an aircraft as described herein. Torque datum 112 may indicate the torque of a rotor shaft attached to turbine rotors of one or more propulsors, such as at least a propulsor 116.

With continued reference to FIG. 1, torque datum 112 may be detected by utilizing a least squares method. A least squares method may utilize the equation $$y = Af + d$$

Which represents the least-squares standard form. If the disturbance "d" has a Gaussian distribution, then typical least squares may be applied to solve it, and the solutions is the maximum likelihood estimator. For the purposes of this disclosure, "maximum likelihood estimator" is a method of estimating the parameters of a probability distribution by maximizing a likelihood function, so that under the assumed statistical model the observed data is most probable, in this cast torque datum 112, or the lack thereof. Gaussian distribution is a type of continuous probability distribution for a real-valued random variable. The general form of its probability density function is $$f(x) + \frac{1}{\sigma\sqrt{2\pi}} e^{-\frac{1}{2}\left(\frac{x-\mu}{\sigma}\right)^2}$$

wherein a random variable with a Gaussian distribution is said to be normally distributed and is called a normal deviate. Least squares method to detect fault in an electric aircraft may include standard batch least squares, which requires a running window of past data represented torque outputs of at least a propulsor 116 in a buffer. Additionally, or alternatively, recursive least squares with forgetting may be employed, which requires data only at the current timestep in order to detect torque outputs from at least a propulsor 116. For example, and without limitation, after running the least squares analysis, the elements of "f" that are near to zero value may indicate a faulty at least a propulsor 116. If such a fault is detected for multiple timesteps, a fault may be detected. For example, and without limitation, some filtering may be required to reduce noise in the data collected over series of least squares analysis. Least squares may be employed in regression analysis to approximate a solution of overdetermined systems (sets of equations in which there are more equations than unknowns) by minimizing a sum of the squares of the residuals made in the results of every single equation. Least squares may be used in data fitting. A best fit in the least-squares sense may minimize a sum of squared residuals (a residual being: the difference between an observed value, and the fitted value provided by a model). When a problem has substantial uncertainties in an independent variable and/or variable set (the x variable), then simple regression and least-squares methods may be insufficient; in such cases, methodology employed for fitting errors-in-variables models may be considered instead of that for least squares. Least-squares problems may fall into two categories: linear or ordinary least squares and nonlinear least squares, depending on whether or not the residuals are linear in all unknowns. Linear least-squares problem may occur in statistical regression analysis; it has a closed-form solution. Nonlinear problem may be solved by iterative refinement; at each iteration a system may be approximated by a linear one, and thus a core calculation may be similar in both cases. Polynomial least squares may describe a variance in a prediction of a dependent variable as a function of an independent variable and deviations from a fitted curve. When observations come from an exponential family and mild conditions are satisfied, least-squares estimates, and maximum-likelihood estimates may be identical. Least squares may also be derived as a method of moments estimator.

With continued reference to FIG. 1, system 100 includes at least a sensor 108 which may be configured to constantly search for a change in torque output characterized by torque datum 112 associated with at least a propulsor 116 over a period of time. In other words, if a torque datum is lower than the previous detected torque datum, then a loss of torque may be detected by at least a sensor 108. For the purposes of this disclosure, "loss of torque detection" is detection of torque output that is less, or less by some threshold proportion and/or amount, than an expected torque output for at least a propulsor. One of ordinary skill in the art, upon reviewing the entirety of this disclosure, will understand that detection of torque output that is less than an expected torque value may include a torque output of zero torque or loss of communication with the at least a propulsor 116. Loss of torque may indicate that at least a propulsor 116 associated with torque datum 112 is experiencing a fault or has become inoperable. For the purposes of this disclosure, "one rotor inoperable (ORI)" is a failure state wherein at least a propulsor is not operating at sufficient power output to operate the aircraft normally in its default control mode. At least a sensor 108 may indicate that at least a propulsor is experiencing a fault if multiple torque datum 112 is detected in a row outside of a normal range.

With continued reference to FIG. 1, system 100 includes an observer 120. Observer 120 may be an aircraft motion observer as described in reference to FIG. 2. Observer 120 may be similar to or the same as the aircraft motion observer as described in U.S. patent application Ser. No. 17/218,403 filed on Mar. 3, 2021 and titled, "AIRCRAFT MOTION OBSERVER CONFIGURED FOR USE IN ELECTRIC AIRCRAFT" which is incorporated by reference herein in its entirety. Observer 120 may include one or more circuit elements, computing devices, FGPAs, or other electronic devices configured to generate torque prediction datum 124. Any module as described herein, including without limitation observer and/or mixer, may be created using any combination of hardware and/or software logic commands, and may be physically or conceptually separate from or merged with any other such module, as persons skilled in the art will appreciate upon reviewing the entirety of this disclosure. For the purposes of this disclosure, a "torque prediction datum" is one or more elements of data generated by the system that represents an expected torque output or range of torque outputs associated with at least a propulsor. Torque prediction datum 124 may constantly be output by observer 120 adjusting for aircraft maneuvers and requirements throughout an aircraft's flight envelope such as take-off, banking, climbing, transition from hover to forward flight, transition from forward flight to hover, landing, or other aircraft maneuvers. Observer 120 is configured to compare torque datum 112 and torque prediction datum 124 for at least a propulsor. Observer 120 may be configured to compare torque datum 112 and torque prediction datum 124 utilizing subtraction. In non-limiting embodiments, subtraction may include subtracting torque datum 112 from torque prediction datum 124. In non-limiting embodiments, subtraction may include subtracting torque prediction datum 124 from torque datum 112. Observer 120 may be configured to compare torque datum 112 and torque prediction datum 124 utilizing ratios. In non-limiting embodiments, ratios may include the ratio of torque datum 112 to torque prediction datum 124. In non-limiting embodiments, ratios may include the ration of torque prediction datum 124 to torque datum 112. Observer 120 may be configured to compare torque datum 112 and torque prediction datum 124 utilizing addition. In non-limiting embodiments, addition may include adding torque datum 112 and torque prediction datum 124 and comparing the total to a predetermined threshold datum. The comparison may take place at one point in a flight envelope, constantly with adjusted detected readings and predictions, at regular intervals, when commanded to do so by a pilot, user, or computer, or a combination thereof. Observer 120 may be configured to compare torque datum 112 and torque prediction datum 124 at regular intervals such as every second, every minute, every five minutes, or at a predetermined time interval. Observer 120 is configured to generate residual datum 128. For the purposes of this disclosure, "residual datum" is one or more elements of data representing a difference in a predicted torque and detected torque output of at least a propulsor. In non-limiting embodiments, residual datum 128 may include a difference between torque datum 112 and torque prediction datum 124 as represented by any of the mathematical operations as described herein. Residual datum 128 may indicate that a detected torque datum 112 is less than torque prediction datum 124 which may indicate that at least a propulsor is experiencing a fault and the aircraft may be in ORI. Residual datum 128 may indicate that a detected torque datum 112 is more than torque prediction datum 124 indicated that at least a propulsor is experiencing a fault, at least a sensor 108 is experiencing a fault, or another aircraft state. Residual datum 128 may indicate that torque prediction datum 124, torque datum 112, or another element of data is out of range, greater than a predetermined threshold, lower than a predetermined threshold, or the like.

With continued reference to FIG. 1, system 100 includes mixer 132. Mixer 132 may include one or more circuit elements, one or more computing devices or portions thereof, or other electronic components configured to receive one set of data and allocate a second set of data as an output. In embodiments, mixer 132 may receive a pilot input as described above indicated a desired change in aircraft trajectory and output the torque output by at least a propulsor 116 to accomplish said trajectory change. With continued reference to FIG. 1, a "mixer", for the purposes of this disclosure, is a component that takes in at least an incoming signal, such as initial vehicle torque signal including plurality of attitude command and allocates one or more outgoing signals, such as modified attitude commands and output a torque command, or the like, to at least a propulsor, flight component, or one or more computing devices connected thereto. One of ordinary skill in the art, after reading the entirety of this disclosure, would be aware that a mixer, as used herein, may additionally or alternatively be described as performing "control allocation" or "torque allocation". For example, mixer 132 may take in commands to alter aircraft trajectory that requires a change in pitch and yaw. Mixer 132 may allocate torque to at least one propulsor (or more) that do not independently alter pitch and yaw in combination to accomplish the command to change pitch and yaw. More than one propulsor may be required to adjust torques to accomplish the command to change pitch and yaw, mixer 132 would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure. Mixer 132 may be a nonlinear program-based mixer that create new frequencies from two signals applied to it. In most applications, two signals are applied to mixer 132, and it produces new signals at the sum and difference of the original frequencies. Other frequency component may also be produced in a practical frequency mixer. One of ordinary skill in the art would understand that, in general, mixers are widely used to shift signals from one frequency range to another, a process known as heterodyning. Another form of mixer operates by switching, with the smaller input signal being passed inverted or noninverted according to the phase of the local oscillator (LO). This would be typical of the normal operating mode of a packaged double balanced mixer, with the local oscillator drive considerably higher than the signal amplitude. Mixer 132 may be consistent with any mixer described herein. Mixer 132 may be implemented using an electrical logic circuit. "Logic circuits", for the purposes of this disclosure, refer to an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Mixer 132 may be implemented using a processor. Mixer 132 is configured to receive an initial vehicle torque signal for at least a propulsor from flight controller 104. Mixer 132 may solve at least an optimization problem. At least an optimization problem may include solving the pitch moment function that may be a nonlinear program.

With continued reference to FIG. 1, mixer 132 may include an inertia compensator. An inertia compensator may include one or more computing devices, an electrical component, circuitry, one or more logic circuits or processors, or the like, which may configured to compensate for inertia in one or more propulsors present in system 100. For the purposes of this disclosure, an "inertia compensator" is one or more computing devices, electrical circuits, processors, or the like configured to compensate torque output signals for massive flight components. In non-limiting examples, inertia compensator may increase a torque output signal to get a rotor to spinning and then quickly lower the torque output signal once the rotor has gained momentum and its inertia tends to keep the rotor spinning, consistent with the entirety of this disclosure. Mixer 132 is configured, in general, to output signals and command propulsors to produce a certain amount of torque; however, real-world propulsors contain mass, and therefore have inertia. "Inertia", for the purposes of this disclosure, is a property of matter by which it continues in its existing state of rest or uniform motion in a straight line, unless that state is changed by an external force. Specifically, in this case, a massive object requires more force or torque to start motion than is required to continue producing torque. In a control system, mixer 132 must therefore modulate the would-be signal to account for inertia of the physical system being commanded. The inertia compensator may make appropriate calculations based on modified attitude command 132, output torque commands, and other considerations like environmental conditions, available power, vehicle torque limits, among others. Inertia compensator may adjust vehicle torque limits for certain periods of time wherein, for example, output torque commands may be allowed to overspeed a propulsor to start the propulsor's rotating physical components and then quickly step down the torque as required to maintain the commanded torque. The inertia compensator which may include a lead filter.

With continued reference to FIG. 1, mixer 132 is configured to generate, as a function of residual datum 128, a torque priority command datum 136. For the purposes of this disclosure, "torque priority command datum" is one or more elements of data generated in order to compensate for a change in torque in at least a propulsor. For example, and without limitation, torque priority command datum 136 may be generated in response to residual datum 128 that indicates at least a propulsor 116 has lost all torque capabilities. In this example, torque priority command datum 136 would command another propulsor or flight component to increase in order to maintain an aircraft's safety until emergency procedures such as landing can be accomplished. In non-limiting examples, torque priority command datum 136 may include commanding an opposite propulsor or flight component to increase in response to a rotor losing some torque capability, such as loss of torque detection consistent with the entirety of this disclosure. In further non-limiting examples, torque priority command datum 136 may include increasing torque to all propulsors functioning in a given fault situation in order to compensate for one propulsor 116 outputting a lower torque output than required. For example and without limitation, torque priority command datum 136 may change more than one propulsor's torque output in order to compensate for a loss in torque in at least a propulsor 116. In embodiments, when aircraft includes a quadcopter configuration, if the front right propulsor loses torque, and therefore lift is reduced, the front left and back right propulsors may increase their torque to maintain lift and the back left propulsor may overspeed in reverse to provide negative lift to prevent the aircraft from tipping in the no-lift corner. One of ordinary skill in the art would appreciate that this is only one arrangement of propulsors and does not limit the arrangement, number, or methodology of utilizing predicted and detected data to modify torque output to control an aircraft under ORI conditions.

With continued reference to FIG. 1, mixer 132 may include a first mode configured to control a first plurality of propulsors consistent with at least a propulsor 116. The first mode may be configured to control four propulsors in embodiments. One of ordinary skill in the art, after reading the entirety of this disclosure, would be aware that a mixer in the first mode may perform "control allocation" or "torque allocation" with the first plurality of propulsors, in the above example, four. For example, mixer 132 may take in commands to alter aircraft trajectory that requires a change in pitch and yaw utilizing the first plurality of propulsors. Mixer 132 may allocate torque to the first plurality of propulsors that do not independently alter pitch and yaw in combination to accomplish the command to change pitch and yaw. First plurality of propulsors may be required to adjust torques to accomplish the command to change pitch and yaw, mixer 132 would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure.

In embodiments, under ORI conditions, when at least a propulsor 116 of the four propulsors does not have adequate torque output capabilities, mixer 132 may switch to a second mode configured to control a second plurality of propulsors, which may include, in an illustrative example, three remaining propulsors. Mixer 132 may continue receiving residual datums 128 under this three propulsor configuration and allocate torque accordingly without consideration of the at least a propulsor 116 experiencing a fault. One of ordinary skill in the art, after reading the entirety of this disclosure, would be aware that a mixer in the second mode may perform "control allocation" or "torque allocation" with the second plurality of propulsors, in this example, three. For example, mixer 132 may take in commands to alter aircraft trajectory that requires a change in pitch and yaw utilizing the second plurality of propulsors, as in this example, one propulsor has experienced a fault and is now inoperable. Mixer 132 may allocate torque to the second plurality of propulsors that do not independently alter pitch and yaw in combination to accomplish the command to change pitch and yaw. First plurality of propulsors may be required to adjust torques to accomplish the command to change pitch and yaw, mixer 132 would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, inoperable propulsors, or combinations thereof that could be used in tandem to generate some amount of authority in pitch, roll, yaw, and lift of an electric aircraft consistent with this disclosure. Mixer 132 is configured torque priority command datum 136 to at least a propulsor 116 as a function of the torque allocation considering the torque datum 112 detected.

Figure 2:
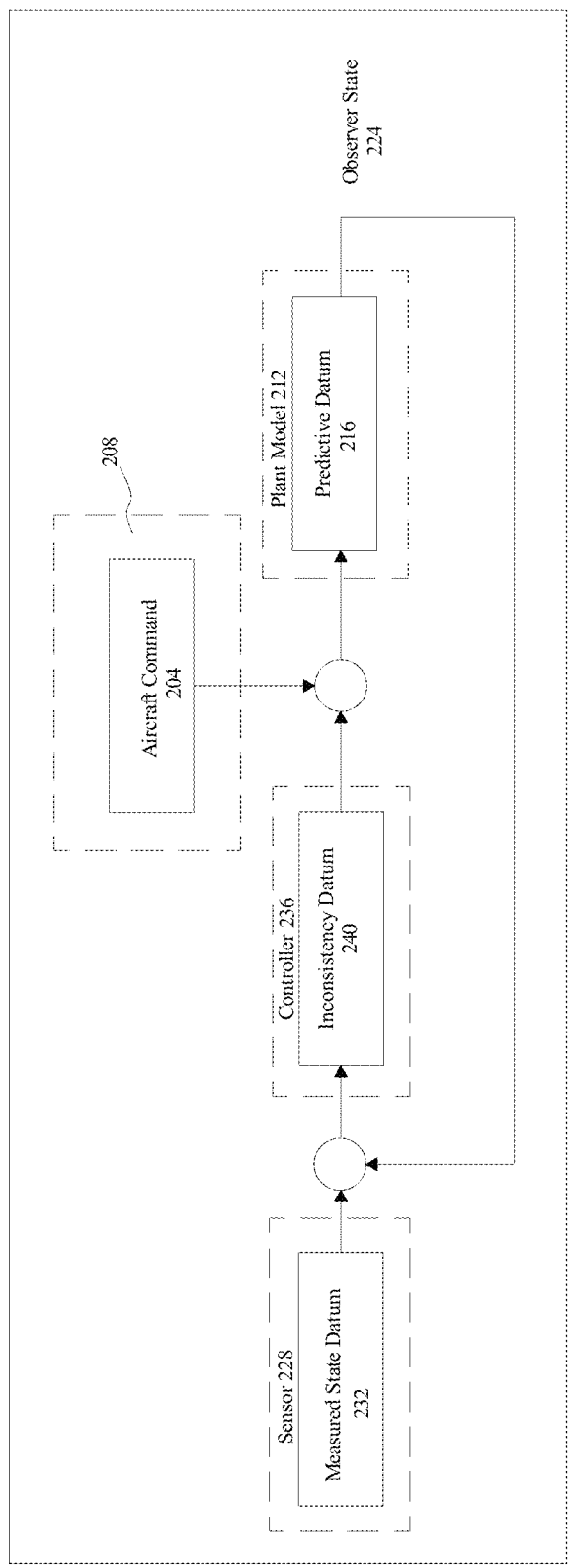
FIG. 2 is a block diagram of an exemplary embodiment of an observer.

Referring now to FIG. 2, an embodiment for an observer 200 for an aircraft observer configured for use in electric aircraft is presented in block diagram form. Observer 200 includes at least as aircraft command 204. For the purposes of this disclosure, an "aircraft command" is a desire of a pilot, user, or operator of a vehicle to change the vehicles trajectory, path, power output, or the like. Observer 200 includes feedforward term 208 which may be the same or similar to any feedforward term as described herein. A "feedforward term", for the purposes of this disclosure, is any and all terms within a control diagram that proceeds forward in a control loop instead of backwards. With feedforward control, the disturbances are measured and accounted for before they have time to affect the system. In an example, such as a house thermostat as described above, a feed-forward system may measure the fact that the door is opened and automatically turn on the heater before the house can get too cold. Feed-forward control may be effective where effects of the disturbances on the system must be accurately predicted. For instance, if a window was opened that was not being measured, a feed-forward-controlled thermostat might let the house cool down. A feedforward control system may operate faster than a feedback control system, which differs from the former in that it includes both feedforward signals and feedback signals. However, feedback control systems may generally be more controllable and more accurate because of an ability to compare control outputs to sensed inputs using feedback signals, which permits modification of the latter to minimize error based on comparison. An observer is a feedback system that modifies a model used in feedforward control to account for sources of error that a feedback loop would otherwise detect. This may produce a system that has the speed advantages of feedforward control without sacrificing the controllability and/or of feedback control; the motion observer itself may be taught using a feedback loop, for instance and without limitation as described in this disclosure.

With continued reference to FIG. 2, observer 200 includes plant model 212. Plant model 212 may include an actuator model similar to or the same as actuator model. Plant model 212 may include one or more actuator models consistent with any actuator model as described herein. A "plant model", for the purposes of this disclosure, is a component of control theory which includes a process and an actuator. A plant is often referred to with a transfer function which indicates the relation between an input signal and the output signal of a system without feedback, commonly determined by physical properties of the system. In a system with feedback, as in illustrative embodiments, herein described, the plant still has the same transfer function, but a control unit and a feedback loop, which possess their own transfer functions, are added to the system. Plant model 212 may use rigid body mechanics and kinematics as previously described, or another undisclosed method of modeling three-dimensional bodies subject to flows, such as computational flow dynamics analysis, which may include flight component CFD as described previously in regard to actuator model. Plant model 212 is configured to generate predictive datum 216 consistent with any predictive datum as described herein such that the predictive datum represents predicted behavior of the aircraft subject to certain flows given at least an aircraft command 204. Observer state 224 may be consistent with observer state 224 wherein it may represent predicted behavior of aircraft motion. Observer 200 includes at least a sensor 228 configured to detect measured state datum 232 which may be consistent with the one or more sensors described in regard to sensor 228 and measured state datum 232 describing the real-world behavior of the aircraft in response to at least an aircraft command 204. Observer 200 includes controller 236 which may be the same or similar to controller 236 configured to generate inconsistency datum 240 which may be the same as or similar to inconsistency datum 240 which represents a compensation between how well predictive datum predicted the measured state datum. That is to say that the inconsistency datum compensates for the subsequent prediction from the plant model based on how accurately the previous plant model's prediction represented the measured state datum of the real-world aircraft.

With continued reference to FIG. 2, a "performance datum", for the purposes of this disclosure, is a mathematical datum or set of data that presents the resultant forces, torques, or other interactions between the plurality of flight components and the fluid flow in order to predict the behavior of the flight components during performance. Performance datum may be represented by one or more numbers, values, matrices, vectors, mathematical expressions, or the like for use in one or more components of observer 200. Performance datum may be an electrical signal capable of use by one or more components of observer 200. Performance datum may be an analog or digital signal. Observer 200 may include electronics, electrical components, or circuits configured to condition signals for use between one or more components present within system like analog to digital converters (ADC), digital to analog converters (DAC), and the like.

With continued reference to FIG. 2, at least an aircraft command 204 indicates a desired change in aircraft heading or thrust, flight controller translates pilot input. That is to say that flight controller may be configured to translate a pilot input, in the form of moving an inceptor stick, for example, into electrical signals to at least an actuator that in turn, moves at least a portion of the aircraft in a way that manipulates a fluid medium, like air, to accomplish the pilot's desired maneuver. At least a portion of the aircraft that an actuator moves may be a control surface. An actuator, or any portion of an electric aircraft may include one or more flight controllers configured to perform any of the operations described herein and communicate with each of the other flight controllers, controllers, and other portions of an electric aircraft.

With continued reference to FIG. 2, a "control surface" as described herein, is any form of a mechanical/hydraulic/pneumatic/electronic/electromechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

With continued reference to FIG. 2, in embodiments, feedforward control, the disturbances are measured and accounted for before they have time to affect the system. In an example, such as a house thermostat as described above, a feed-forward system may measure the fact that the door is opened and automatically turn on the heater before the house can get too cold. Feed-forward control may be effective where effects of the disturbances on the system must be accurately predicted. For instance, if a window was opened that was not being measured, a feed-forward-controlled thermostat might let the house cool down. A feedforward control system may operate faster than a feedback control system, which differs from the former in that it includes both feedforward signals and feedback signals. However, feedback control systems may generally be more controllable and more accurate because of an ability to compare control outputs to sensed inputs using feedback signals, which permits modification of the latter to minimize error based on comparison. An observer is a feedback system that modifies a model used in feedforward control to account for sources of error that a feedback loop would otherwise detect. This may produce a system that has the speed advantages of feedforward control without sacrificing the controllability and/or of feedback control; the motion observer itself may be taught using a feedback loop, for instance and without limitation as described in this disclosure.

With continued reference to FIG. 2, plant model 212 may include a Newton Euler computational flow dynamic model (CFD). A Newton Euler CFD may include a model in which a plurality of flows may be simulated over a plurality of flight components over the entire range of motion of the flight components and the resultant torques and forces generated therefrom may be modeled. CFD analysis may be the same or similar to CFD analysis described in this disclosure with regard to actuator model. Flight components used in a Newton Euler CFD may be any of the flight components as described in this disclosure, including but not limited to, actuators, control surfaces, geometries related to an aircraft, and the like, among others. The "flows" for the purposes of this disclosure, is the flow of a liquid or gas over a physical body with a volume. Flows may include any fluid with the necessary viscosity to flow over a solid body. Flow may include inviscid flow, turbulent flow, incompressible flow, compressible flow, and laminar flow, among others. CFD analysis may also include and/or model resultant torques and forces on an aircraft in one or more orientations with respect to flow. "Laminar flow", for the purposes of this disclosure, is characterized by fluid particles following smooth paths in layers, with each layer moving smoothly past the adjacent layers with little or no mixing. "Turbulent flow", for the purposes of this disclosure, is fluid motion characterized by chaotic changes in pressure and flow velocity; this may represent a contrast to a laminar flow, which occurs when a fluid flows in parallel layers, with no disruption between those layers. "Inviscid flow", for the purposes of this disclosure, is the flow of an inviscid fluid, in which the viscosity of the fluid is equal to zero. "Incompressible flow", for the purposes of this disclosure, is a flow in which the material density is constant within a fluid parcel an infinitesimal volume that moves with the flow velocity. An equivalent statement that implies incompressibility is that the divergence of the flow velocity is zero. "Compressible flow", for the purposes of this disclosure, is a flow having a significant change in fluid density. While all flows are compressible in real life, flows may be treated as being incompressible when the Mach number is below 0.3.

With continued reference to FIG. 2, a "predictive datum", for the purposes of this disclosure, is one or more elements of data representing the reaction of the rigid body representing an electric aircraft based on the actuator model and performance datum. Predictive datum 216 may be one or more vectors, coordinates, torques, forces, moments, or the like that represent the predicted movement or position of the rigid body subject to the model fluid dynamics as a function of the performance datum. Predictive datum 216 may include, be correlated with, or be the data presenting movement, velocities, or torques on the rigid body after application of fluid flows. Predictive datum 216 may be generated as a function of angle of attack (AoA). "Angle of attack", for the purposes of this disclosure, is the relative angle between a reference line on a body (herein the rigid body), and the vector representing the relative motion between the body and the fluid through which it is moving. In other words, angle of attack, is the angle between the body's reference line and the oncoming flow. The reference line may include the farthest two points on the rigid body such that the line approximates the length of the rigid body. In the context or airfoils, the reference line may be the chord line, which connects the leading edge and the trailing edge of the airfoil. Plant model 212 may be configured to generate predictive datum 216 as a function of a signal from at least a flight component. A signal may include a position of one or more flight components such as control surfaces, throttle position, propulsor output, any datum associated with the aircraft, and any pilot command datum as described herein, among others. In situations where angle of attack is not useful, not available, or in general when it is not advantageous to use angle of attack as an input to the plant model 212, throttle position and/or a signal from one of the plurality of flight components may be used as a proxy. There may be data that correlates throttle position to angle of attack and/or airspeed that may be used as a suitable input to plant model 212. Airspeed may also be used as a suitable proxy for flow types in certain situations where other parameters are unavailable. Airspeed may be used separately or in combination with other inputs. An "airspeed", for the purposes of this disclosure, is the speed of a body moving through the fluid relative to the fluid. The throttle may be consistent with any throttle or other pilot control as discussed herein. This in no way precludes the use of other proxies for plant model 212 inputs such as collective pitch or other pilot inputs alone or in combination.

With continued reference to FIG. 2, a "measured state datum", for the purposes of this disclosure, is one or more elements of data representing the actual motion/forces/moments/torques acting on the aircraft in the real world as a function of the at least an aircraft command 204. A measured state datum 232 includes an inertial measurement unit. An "inertial measurement unit", for the purposes of this disclosure, is an electronic device that measures and reports a body's specific force, angular rate, and orientation of the body, using a combination of accelerometers, gyroscopes, and magnetometers, in various arrangements and combinations. Sensor 228 measures the aircraft's actual response in the real world to the at least an aircraft command 204. Sensor 228 may include a motion sensor. A "motion sensor", for the purposes of this disclosure, is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 228 may include, torque sensor, gyroscope, accelerometer, torque sensor, magnetometer, inertial measurement unit (IMU), pressure sensor, force sensor, proximity sensor, displacement sensor, vibration sensor, among others. Sensor 228 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Controller 236 is configured to compare the predictive datum 216, i.e., one or more elements of observer state 224, and the measured state datum 232. Controller 236 may include one or more circuit elements communicatively and electrically connected to one or more components described herein. Controller 236 may perform one or more mathematical operations, manipulations, arithmetic, machine-learning, or a combination thereof on one or more elements of data. Controller 236 generates, as a function of the comparing, generate inconsistency datum 240 wherein inconsistency datum 240 includes a mathematical function to compensate for the difference between the predictive datum 216 and the measured state datum 232. Controller 236 is configured to compensate for the difference between predictive datum 216, which is the prediction of the behavior of the aircraft and the actual behavior of the aircraft as characterized by measured state datum 232. Controller 236 generates inconsistency datum 240 such that the inconsistency datum 240 on the subsequent control loop can be an input to plant model 212 and preemptively adjust predicted datum 216 as to more accurately predict aircraft behavior. In a non-limiting illustrative example, if plant model 212 generates the perfect predictive datum 216, such that it perfectly predicts the aircraft behavior given the at least an aircraft command 204, performance datum, then the measured state datum 232 detected by sensor 228 would represent the same quantities. Therefore controller 236 would generate inconsistency datum 240 that would not provide any additional compensation on the subsequent control loop.

Figure 3:
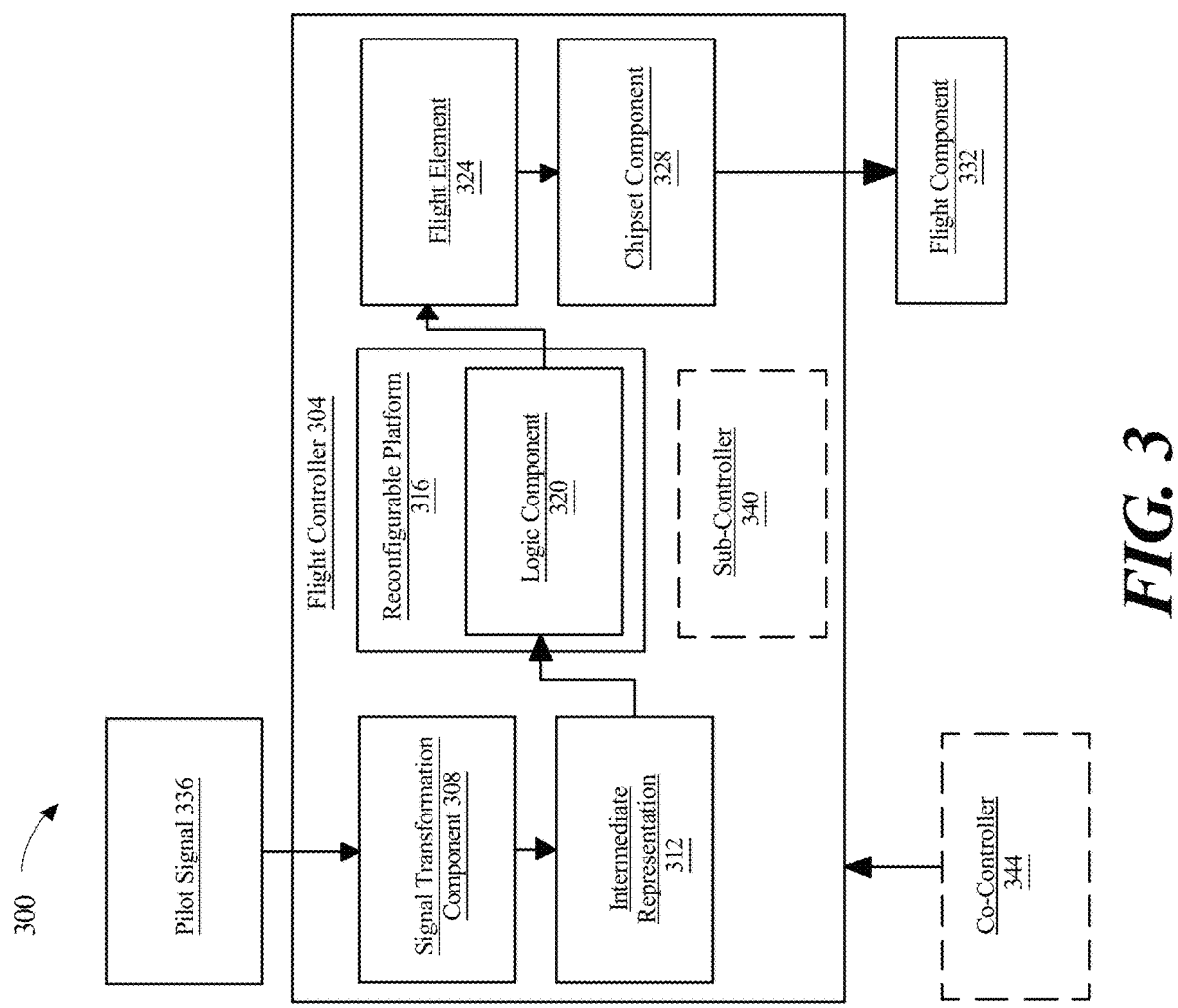
FIG. 3 is a block diagram of an exemplary embodiment of a flight controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally, or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally, or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
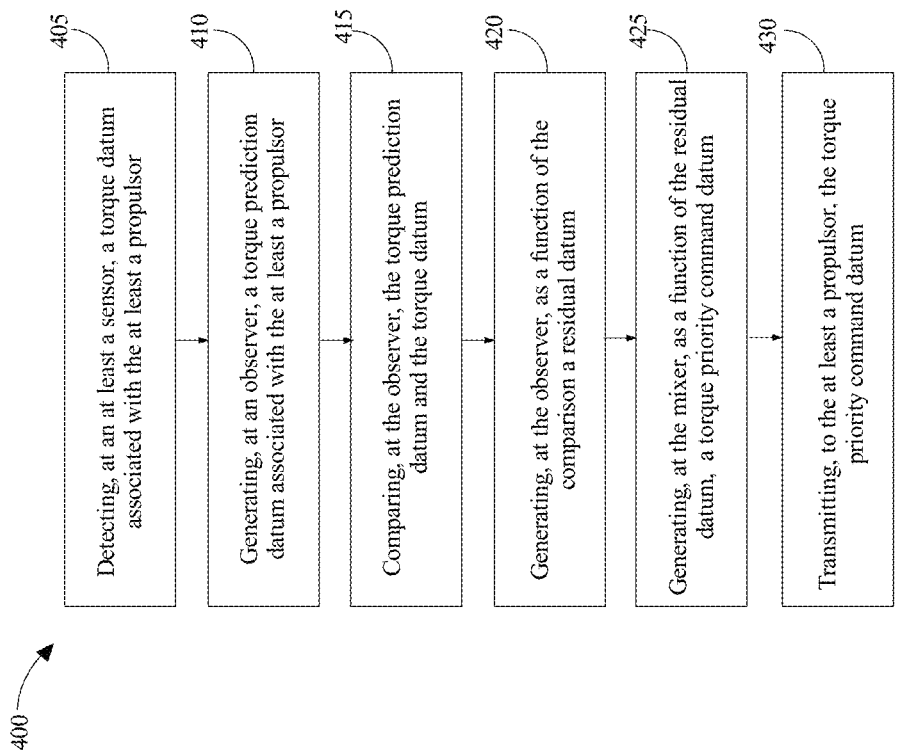
FIG. 4 is a flow diagram of an exemplary method for fault detection and control under one rotor inoperable conditions.

Referring now to FIG. 4, a method 400 for fault detection and control under one rotor inoperable condition configured for use in an electric aircraft is illustrated in flow diagram form. At step 405, the method includes detecting, at an at least a sensor, a torque datum associated with at least a propulsor. Torque datum may be consistent with any torque datum as described herein. At least a sensor may be consistent with any sensor or grouping of sensors as described herein. Torque datum may indicate a loss of torque associated with at least a propulsor. At least a propulsor may be consistent with any propulsor as described herein. Torque datum may be detected utilizing a least squares method. Least squares method may be consistent with any least squares method as described herein. Torque loss may be detected if torque datum is detected at multiple time intervals consistent with torque datums in a range that would indicate torque loss.

Still referring to FIG. 4, at step 410, method 400 includes generating, at the observer, a torque prediction datum associated with the at least a propulsor. Observer may be consistent with any observer as described herein including aircraft motion observer. Torque prediction datum may be consistent with any torque prediction datum. Observer may compare the torque prediction datum and the torque datum at regular intervals. Observer may indicate that the torque prediction datum and the torque datum comparison is greater than a predetermined threshold. The predetermined threshold may be consistent with any predetermined threshold as described herein.

Still referring to FIG. 4, at step 415, method 400 includes comparing, at the observer, the torque prediction datum and the torque datum. Observer may be consistent with any observer as described herein. Torque prediction datum may be consistent with nay torque prediction datum as described herein. Torque datum may be consistent with any torque datum as described.

Still referring to FIG. 4, at step 420, method 400 includes generating, at the observer, as a function of the comparison, a residual datum. Residual datum may be consistent with any residual datum as described herein. Residual datum may be a difference between the torque prediction datum and the torque datum.

Still referring to FIG. 4, at step 425, method 400 includes generating, at the mixer, as a function of the residual datum, a torque priority command datum. Torque priority command datum may be consistent with any torque priority command datum. Mixer may include a first mode configured for control of a first plurality of propulsors and a second mode configured for control of a second plurality of propulsors.

Torque priority command datum comprises increasing torque to the at least a propulsor as a function of the detection of a loss of torque. Loss of torque may be consistent with any loss of torque as described herein.

Still referring to FIG. 4, at step 430, method 400 includes transmitting, to the at least a propulsor, the torque priority command datum. At least a propulsor may be consistent with any propulsor as described.

Figure 5:
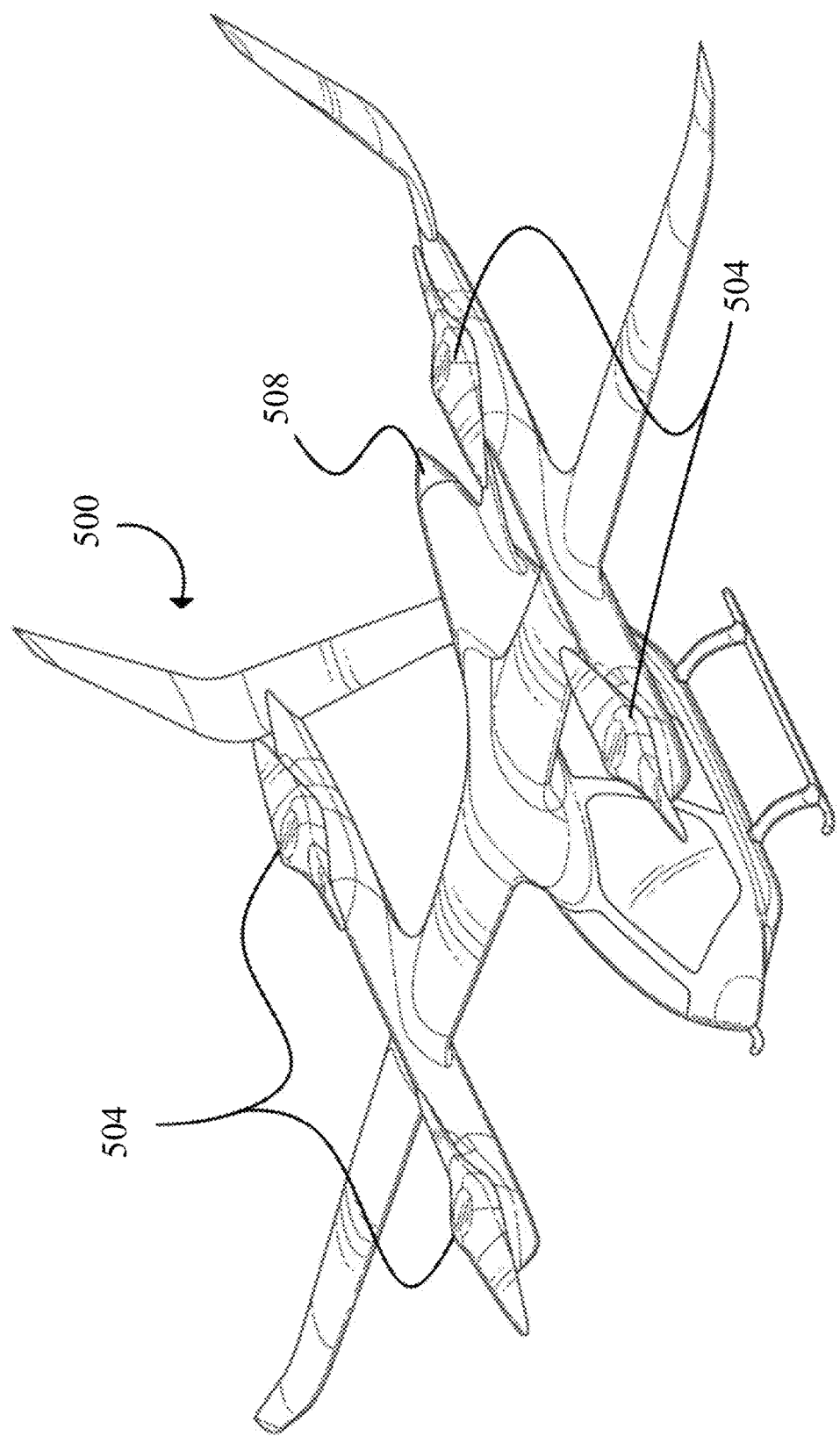
FIG. 5 is an illustration of an exemplary embodiment of an aircraft in isometric view.

Referring now to FIG. 5, an embodiment of an electric aircraft 500 is presented. Still referring to FIG. 5, electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on an electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, baggage, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Referring still to FIG. 5, Aircraft may include at least a vertical propulsor 504 and at least a forward propulsor 508. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 504 is a propulsor that generates a substantially downward thrust, tending to propel an aircraft in a vertical direction providing thrust for maneuvers such as without limitation, vertical take-off, vertical landing, hovering, and/or rotor-based flight such as "quad-copter" or similar styles of flight.

With continued reference to FIG. 5, at least a forward propulsor 508 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 504 and at least a forward propulsor 508 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 5, during flight, a number of forces may act upon the electric aircraft. Forces acting on an aircraft 500 during flight may include thrust, the forward force produced by the rotating element of the aircraft 500 and acts parallel to the longitudinal axis. Drag may be defined as a rearward retarding force which is caused by disruption of airflow by any protruding surface of the aircraft 500 such as, without limitation, the wing, rotor, and fuselage. Drag may oppose thrust and acts rearward parallel to the relative wind. Another force acting on aircraft 500 may include weight, which may include a combined load of the aircraft 500 itself, crew, baggage and fuel. Weight may pull aircraft 500 downward due to the force of gravity. An additional force acting on aircraft 500 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

With continued reference to FIG. 5, at least a portion of an electric aircraft may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight.

With continued reference to FIG. 5, in an embodiment, at least a portion of the aircraft may include a propulsor, the propulsor may include a propeller, a blade, or any combination of the two. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis.https://en.wikipedia.org/wiki/Blade_pitch The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and still referring to FIG. 5, an actuator may be mechanically coupled to a control surface at a first end and mechanically coupled to an aircraft, which may include any aircraft as described in this disclosure at a second end. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft.

With continued reference to FIG. 5, in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Figure 6:
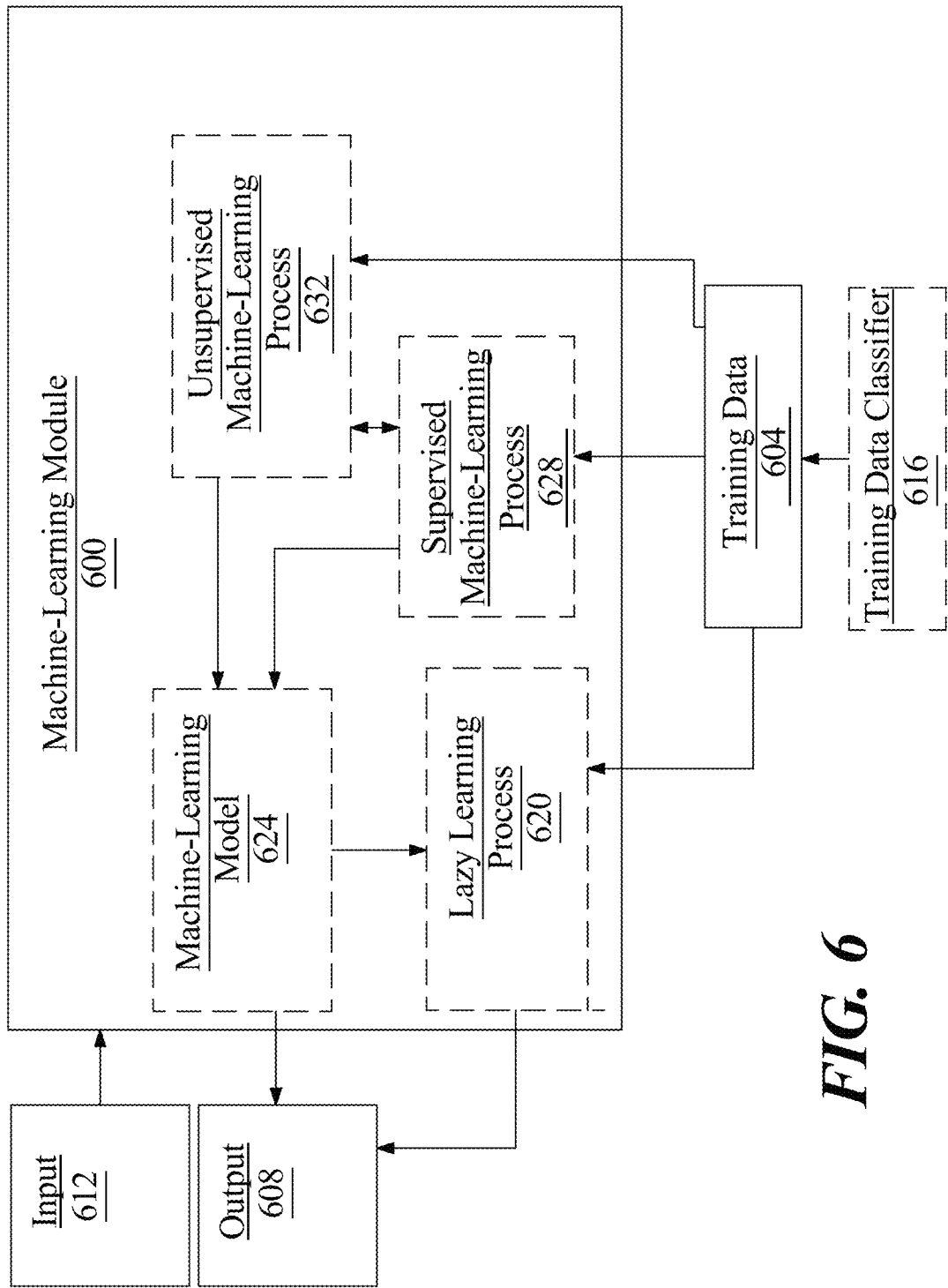
FIG. 6 is a block diagram of an exemplary embodiment of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
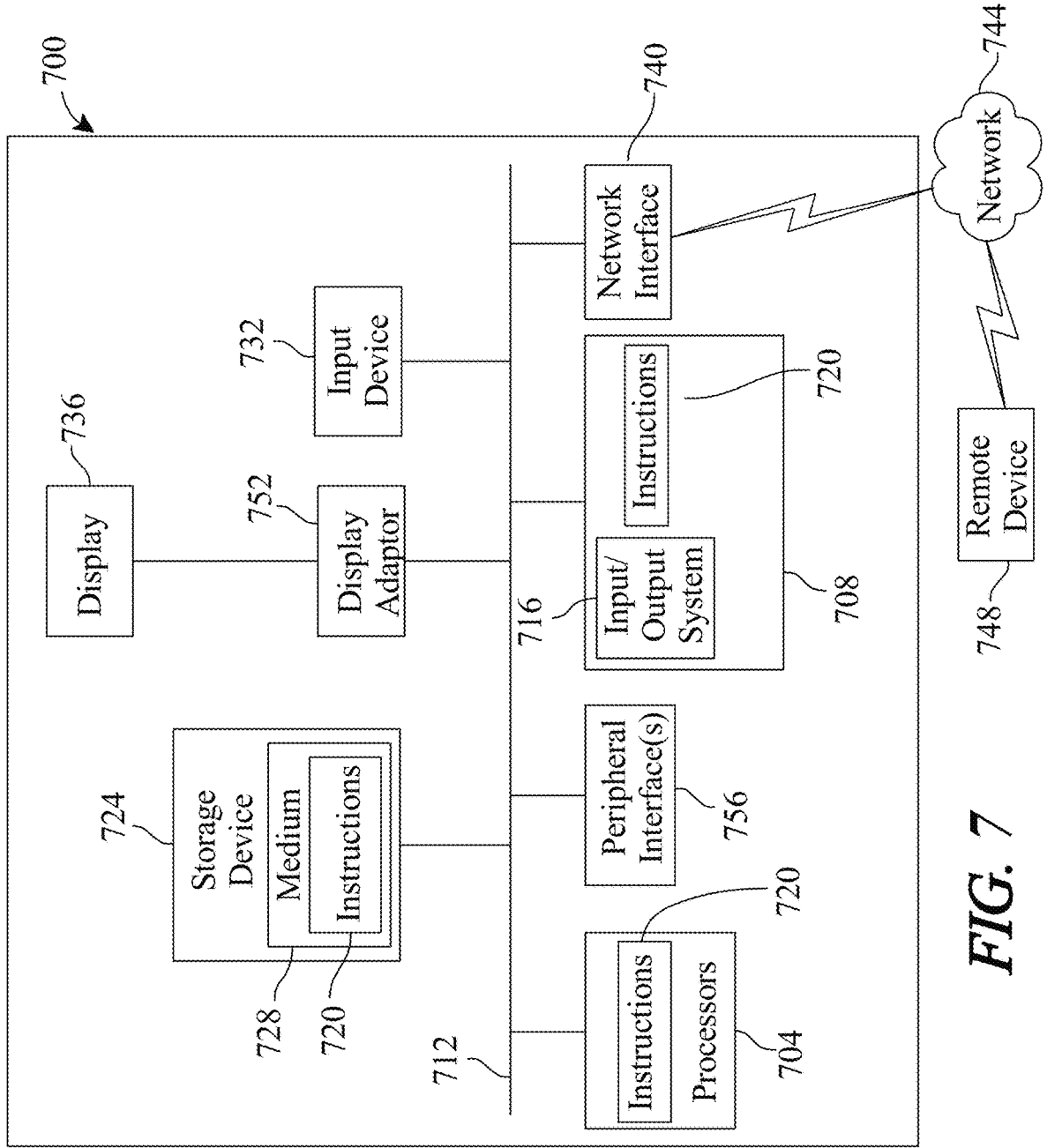
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for fault detection and control in an electric aircraft, the system comprising:
   a flight controller, the flight controller comprising:
   at least a sensor, wherein the at least a sensor configured to detect a sensed datum associated with at least a propulsor;
   an observer, the observer configured to:
   generate a prediction datum associated with the at least a propulsor;
   compare the prediction datum with the sensed datum;
   generate a residual datum as a function of the comparison; and
   determine a failure state of the at least a propulsor as a function of the residual datum;
   a mixer configured to operate in a first mode in which the mixer is configured to control a first plurality of the at least a propulsor and a second mode in which the mixer is configured to control a second plurality of the at least a propulsor, the mixer comprising circuitry configured to:
   generate, as a function of the residual datum and the failure state, a torque priority command datum; and
   transmit, to the at least a propulsor, the torque priority command datum configured to command operation of the first plurality of the at least a propulsor.

2. The system of claim 1, wherein sensed datum comprises a speed of the at least a propulsor.

3. The system of claim 2, wherein the observer is further configured to calculate a torque datum as a function of the sensed datum.

4. The system of claim 3, wherein:
   the prediction datum is a torque prediction datum; and
   comparing the prediction datum with the sensed datum comprises comparing the torque prediction datum to the torque datum.

5. The system of claim 1, wherein the mixer further comprises an inertia compensator.

6. The system of claim 1, wherein the observer is configured to compare the prediction datum and the sensed datum at regular intervals.

7. The system of claim 1, wherein the observer is configured to indicate that the prediction datum and the sensed datum comparison is greater than a predetermined threshold.

8. The system of claim 1, wherein the residual datum is difference between the prediction datum and the sensed datum.

9. The system of claim 1, wherein the torque priority command datum comprises a command to increase torque to the at least a propulsor as a function of the detection of a loss of torque.

10. The system of claim 9, wherein detection of a loss of torque further comprises detection of the loss of torque at multiple time intervals.

11. A method for fault detection and control in an electric aircraft, the method comprising:
    detecting, at an at least a sensor, a sensed datum associated with at least a propulsor;
    generating, at an observer, a prediction datum associated with the at least a propulsor;
    comparing, at the observer, the prediction datum and the sensed datum;
    generating, at the observer, as a function of the comparison, a residual datum;
    generating, at the observer, as a function of the residual datum, a failure state of the at least a propulsor;
    generating, at a mixer that is configured to operate in a first mode in which the mixer is configured to control a first plurality of the at least a propulsor and a second mode in which the mixer is configured to control a second plurality of the at least a propulsor, as a function of the residual datum and the failure state, a torque priority command datum; and
    transmitting, to the at least a propulsor, the torque priority command datum configured to command operation of at least one flight component of the electric aircraft.

12. The method of claim 11, wherein sensed datum comprises a speed of the at least a propulsor.

13. The method of claim 12, further comprising, calculating, at the observer, a torque datum as a function of the sensed datum.

14. The method of claim 13, wherein:
the prediction datum is a torque prediction datum; and
comparing the prediction datum with the sensed datum comprises comparing the torque prediction datum to the torque datum.

15. The method of claim 11, wherein the mixer further comprises an inertia compensator.

16. The method of claim 11, wherein comparing the prediction datum and the sensed datum comprises comparing the prediction datum and the sensed datum at regular intervals.

17. The method of claim 11, further comprising indicating, at the observer, that the prediction datum and the sensed datum comparison is greater than a predetermined threshold.

18. The method of claim 11, wherein the residual datum is difference between the prediction datum and the sensed datum.

19. The method of claim 11, wherein the torque priority command datum comprises a command to increase torque to the at least a propulsor as a function of the detection of a loss of torque.

20. The method of claim 19, wherein detection of a loss of torque further comprises detection of the loss of torque at multiple time intervals.

\* \* \* \* \*